United States Patent [19]
Bodurek, Jr. et al.

[11] Patent Number: 6,104,554
[45] Date of Patent: Aug. 15, 2000

[54] PROJECTION TELEVISION LENS ASSEMBLY

[75] Inventors: Felix J. Bodurek, Jr., Florence, Ky.; Livyn O. Okorocha, Cincinnati, Ohio

[73] Assignee: U.S. Precision Lens, Cincinnati, Ohio

[21] Appl. No.: 09/336,315

[22] Filed: Jun. 18, 1999

Related U.S. Application Data

[60] Provisional application No. 60/132,832, May 6, 1999.

[51] Int. Cl.$^7$ .................................................. G02B 7/02
[52] U.S. Cl. .......................................... 359/820; 359/819
[58] Field of Search .................................... 359/819, 820, 359/822, 823, 826, 827

[56] References Cited

U.S. PATENT DOCUMENTS

| | | | |
|---|---|---|---|
| 2,453,003 | 11/1948 | Edwards | 178/7.5 |
| 4,190,325 | 2/1980 | Moreno | 359/820 |
| 4,236,790 | 12/1980 | Smith | 359/820 |
| 4,460,245 | 7/1984 | Shimizu | 359/820 |
| 4,525,745 | 6/1985 | Ghaem-Maghami et al. | 358/237 |
| 4,609,945 | 9/1986 | Oguino | 358/237 |
| 4,651,217 | 3/1987 | Yamazaki | 358/231 |
| 4,693,555 | 9/1987 | Arai et al. | 359/820 |
| 4,919,519 | 4/1990 | Fantozzi et al. | 359/820 |
| 4,948,226 | 8/1990 | Ozaki | 359/820 |
| 5,067,808 | 11/1991 | Alscher | 352/140 |
| 5,157,554 | 10/1992 | Kashihara | 359/820 |
| 5,276,555 | 1/1994 | Sansbury | 359/826 |
| 5,570,238 | 10/1996 | Leary | 359/820 |
| 5,576,895 | 11/1996 | Ikeda | 359/811 |
| 5,587,838 | 12/1996 | Kasihara | 359/649 |
| 5,617,259 | 4/1997 | Inoue | 359/820 |
| 5,633,763 | 5/1997 | Suzuki et al. | 359/822 |
| 5,652,680 | 7/1997 | Kashihara et al. | 359/819 |
| 5,731,917 | 3/1998 | Inoue | 359/820 |
| 5,734,511 | 3/1998 | Braat | 359/820 |

FOREIGN PATENT DOCUMENTS

| | | |
|---|---|---|
| 61/292112 | 12/1986 | Japan . |
| 61/292113 | 12/1986 | Japan . |

*Primary Examiner*—Loha Ben
*Attorney, Agent, or Firm*—Silvy A. Murphy

[57] ABSTRACT

A projection television lens system having a device that distorts for telescopically adjusting an A/B assembly, the tubular member that carries the A and B lens elements within a focus mount of a projection television lens system. Additionally, at one end of the lens, there is provided a fixed mounting site, i.e. a mounting site which is fixed in position with respect to the CRT 9 assembly. A device is then provided which connects the fixed mounting site to the tubular member. The thermal and structural characteristics of the device are selected so that the device itself distorts in response to temperature changes and thereby moves the A and B lens elements toward or away from the C element in response to, respectively, increased or decreased ambient temperature. In the most preferred embodiment, the fixed mounting site is on the focus mount at the image side of the lens assembly. The tube, carrying the A/B elements and mounted within the focus mount, is connected to the focus mount by a polymer bar which, at one end, is fixed to the focus mount and, at the other end, is fixed to the A/B assembly. Thereby, when the ambient temperature increases, the bar expands and moves the A/B assembly only axially and not rotationally toward the C element. The material of the bar and its dimensions are selected such that, in response to exposure to increased ambient temperature, the A/B assembly is moved toward the C element by an amount appropriate to maintain focus or substantially compensate for the distortion of the C element.

16 Claims, 8 Drawing Sheets

PROJECTION TELEVISION LENS ASSEMBLY

This application claims the benefit of U. S. Provisional Application, Serial No. 60/132,832, filed May 6, 1999 entitled PROJECTION TELEVISION LEN ASSEMBLY, by F. J. Bodurek and L. O. Okorocha.

BACKGROUND OF THE INVENTION

Projection televisions (PTVs) are well known. In general, a projection television set or projector includes three cathode ray tubes (CRTs), corresponding to the primary colors, red, blue and green. Associated with each of the CRTs is a projection lens assembly, which is comprised of a plurality of lens elements. Overall, the function of the lens assembly is to magnify the image appearing on the CRT faceplate and thereby project it onto a viewing screen, which is much larger than the faceplate of the CRT.

In a projection television, the image appearing on the CRT undergoes significant magnification. For example, typical CRTs used in projection televisions have a diameter of 3–6 inches. However, the images are projected onto a screen which typically has a size ranging from 48 to 60 inches or larger. In view of this substantial magnification, it is important that each of the CRTs provide maximum brightness or light intensity. Indeed, the need for light intensity is a reason why three separate CRTs are used in projection televisions. In order to maximize the intensity, each CRT is operated at maximum power to produce maximum light output at the faceplate. A consequence of operating at maximum power, together with the fact that each of the CRTs in projection television is contained within an enclosure, results in the generation of considerable heat within the enclosure. Consequently, each of the lens systems associated with each of the CRTs may undergo very considerable temperature change. Indeed, in projection television sets sold commercially and used residentially, it is not uncommon for the ambient temperature in the interior of the set to be elevated by 40° C. to 45° C. and some components by 90° C.

As a result of the lens system being exposed to an elevated ambient temperature, a variety of distortions are caused in the lens system, which result from thermally induced expansion of the components of the system. One particularly troublesome distortion, well known and appreciated by those skilled in this art, is the thermally induced distortion of one or more of the lens elements, whereby the focus of the lens system will change as the ambient temperature increases. Thereby, after some hours of operation, the picture displayed on the screen will become blurred as a result of defocusing.

Figure 1:
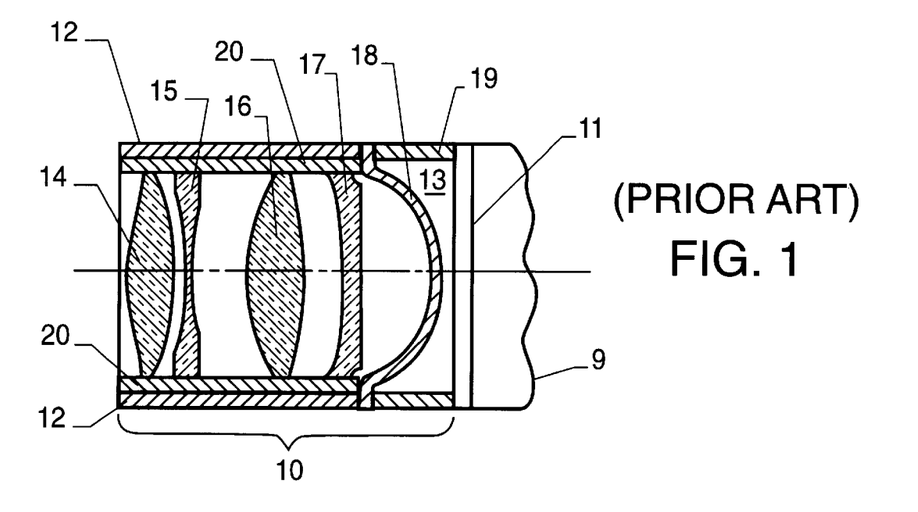
FIG. 1 is a schematic side-sectional view of a prior art lens assembly.

An illustrative, prior art projection television lens assembly 10 is shown in FIG. 1. As shown therein, a CRT 9 has a faceplate 11. The lens assembly 10 is affixed to the CRT 9 and includes a first lens element 18. As shown, the first lens element 18, which in the art is often referred to as a "C element" or "field flattener" and has a uniform thickness, is typically made of plastic and is convex to the CRT 9 and concave to the image side of the lens assembly 10. The periphery of the first lens element 18 is sandwiched between a coupler 19, which in turn is secured to the CRT 9, and focus mount 12. Typically, the space 13, defined by the first lens element 18, the faceplate 11 and the coupler 19, is filled with a liquid and defines a concave lens, which functions as a so-called field flattener. In addition, the liquid contained in the space 13 functions to conduct heat from the CRT 9 to the coupler 19, which, in turn, typically is provided with a plurality of fins (not shown) for maximizing heat transfer to the ambient environment.

Considering further the lens assembly 10 shown in FIG. 1, the lens elements 14, 15, 16 and 17 are all secured to a tubular member 20 referred to as a lens cell, which is received within a tubular member 12 referred to as a focus mount. The lens element 14 is often referred to as the so-called "A element". Similarly, the lens elements 15 and 16 are generally referred to as the "B elements". The lens element 17 may be categorized as either a so-called "B/C corrector" or the lens element 17 may be grouped together with the lens elements 15 and 16 and referred to, together, as the "B elements".

As may be seen in FIG. 1, the distances between the lens elements 14, 15, 16 and 17 are fixed because they are respectively secured to the tubular member 20. However, the spacing between the lens element 17 and the first lens element 18 may be adjusted by axially moving the lens cell 20 toward or away from the first lens element 18. When projection television sets are assembled, this axial movement is effected to focus the image on the screen. After the image is focused, the axial position of the tubular member 20 is then fixed with respect to the focus mount 12. An apparatus for achieving such adjustment is shown in U.S. Pat. No. 5,276,555.

After the lens assembly 10 is focused and the lens cell 20 is fixed with respect to the focus mount 12, the set is then supplied to the user. Thereupon, when operating the lens system is, as described above, subjected to an elevated ambient temperature. The lens element 16, as shown in FIG. 1, typically has the maximum positive power in the system. For that reason, and in anticipation of the high temperature to which it will be subjected, that element is typically made of glass, whereby it will undergo little distortion as a result of experiencing an elevated temperature. However, in contrast, the lens element 18 has significant negative power, is made of plastic and is quite thin. As a consequence, when subjected to an elevated ambient temperature and the heated liquid is in the space 13 for a long period of time, the first lens element 18 will distort and the distortion will be manifested as an increase of the radius of curvature of the lens and thereby a decrease in the negative power of that element. Without correction, the result of distortion of the first lens element 18 will be a loss of focus of the picture.

Although the invention disclosed in U.S. Pat. No. 4,236,790 provides a mechanism for compensating for lens distortion, the invention cannot be manually focused after assembly and can only be automatically focused after assembly has been completed. Further, the lens assembly disclosed in U.S. Pat. No. 4,525,745 teaches focusing of the lens assembly with movable parts, where a piston in a cylinder attached to the focus adjustment of the lens assembly to rotationally move within the cylinder, which in turn axially moves the lens housing, thus, achieving automatic focusing by both rotational and axial movement.

An object of this invention is to provide a construction and method of operation whereby, in a projection television lens assembly, there is automatic compensation for lens distortion which occurs as a result of temperature changes to which the assembly is exposed. Thereby, the focal length of the system is maintained and the loss of focus is either prevented or substantially reduced.

Another object is to provide a construction and method of operation of a PTV lens assembly whereby the distortion of a lens is automatically accommodated.

SUMMARY OF THE INVENTION

In accordance with the preferred embodiment of the present invention, the tubular member in a projection television lens system which carries the A and the B elements is not longitudinally-fixed during the operation of the system. Additionally, at one end of the lens, there is provided a fixed mounting site, i.e. a mounting site which is fixed in position with respect to the CRT 9 assembly. A device is then provided which connects the fixed mounting site to the tubular member. The thermal and structural characteristics of the device are selected so that the device itself distorts in response to temperature changes and thereby moves the A and B lens elements only axially and not rotationally toward or away from the C element in response to, respectively, increased or decreased ambient temperature.

In the most preferred embodiment, the fixed mounting site is on the focus mount at the image side of the lens assembly. The tube carrying the A and B elements, known as the A/B assembly, is mounted within the focus mount, and is connected to the focus mount by a polymer bar which, at one end, is fixed to the focus mount and, at the other end, is fixed to the A/B assembly. Thereby, when the ambient temperature increases, the bar expands and moves the A/B assembly only axially and not rotationally toward the C element. The material of the bar and its dimensions are selected such that, in response to exposure to increased ambient temperature, the A/B assembly is moved toward the C element by an amount appropriate to maintain focus or substantially compensate for the distortion of the C element. Because of the nature of the attachment of the bar to the tubular member which carries the A/B assembly, the tubular member moves axially and not rotationally.

DESCRIPTION OF THE DRAWINGS

FIG. 6b is a perspective view of the bottom surface of the thermal bar shown in FIG. 6a.

DESCRIPTION OF THE PREFERRED EMBODIMENT

Figure 2:
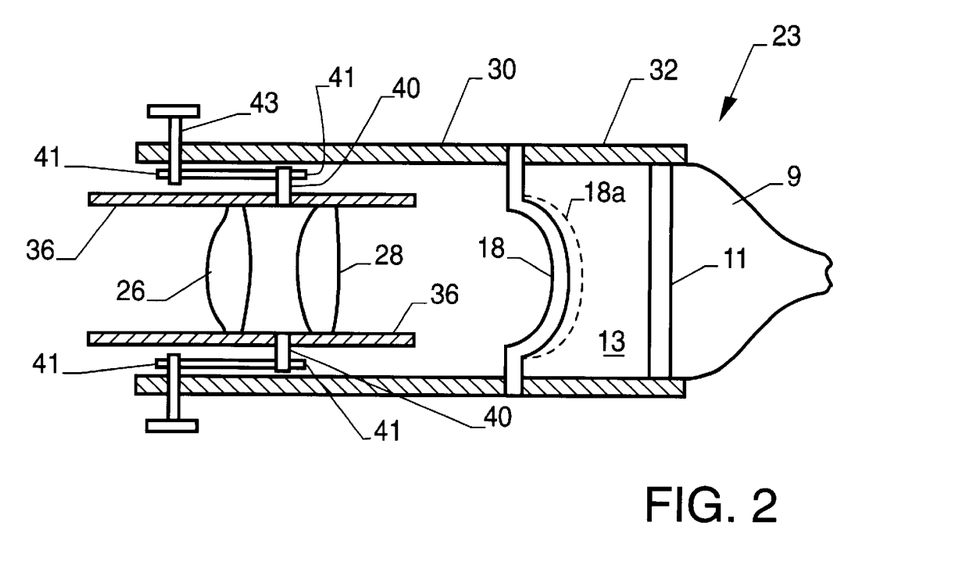
FIG. 2 is a schematic side-sectional view of a lens assembly embodying the preferred embodiment of the invention.

Referring to FIG. 2, the concept of the present invention is illustrated. As shown therein, the glass lens assembly 23 includes a CRT 9 having a faceplate 11. Secured to the CRT 9 is a coupler 32. The first lens element 18 is fixed in the lens assembly 23 by having its periphery sandwiched between the coupler 32 and the focus mount 30. The tubular member 36, also referred to in the art as the lens cell, is mounted within the focus mount 30. The lens cell 36 carries, illustratively, at least two lens elements, namely an "A" element 26 and a "B" element 28. Preferably, the "B" element 28 provides the majority of the positive power to the glass lens 23 and is made of glass. Also, preferably, the "A" element 26 is made of plastic, has at least one aspheric surface, and corrects for aperture dependent aberrations. The lens elements 26 and 28 are fixedly mounted within the lens cell 36.

The lens cell 36 has two pins 40 attached thereto and which are located on the lens cell 36 approximately 180° apart from each other. As shown in FIG. 2, the pins 40 extend outwardly and are each connected to a bar 41 at one end thereof. The other end of each bar 41 is connected to pins 43 which extends radially outward through focus mount 30.

When a lens assembly 23 of the type shown in FIG. 2 is located within a projection television set, as explained above, the temperature within the PTV set increases when the television is used. As a consequence, the temperature of the first lens element or "C" element 18 increases and consequently, as shown in FIG. 2, it is distorted, for example, to a new position 18a. As a result, the power of the lens unit, which is comprised of the coupler 32, the faceplate 11 of the CRT 9, the "C" element 18, and the fluid contained in space 13, decreases. Simultaneously, as the temperature increases, the two bars 41 expand. Because the pins 43 are fixed to the focus mount 30 which in turn is fixed to the CRT 9 through connection with the coupler 32, the expansion of the bars 41 consequently moves the lens cell toward the "C" element 18. The thermal coefficient of expansion of the bars 41 and the length of the bars 41 is selected such that expansion of the bars 41, and thereby the movement of the lens cell maintains a spacing between the lens elements 28 and 18 such that focus is maintained. When a PTV set containing such a lens assembly 23 is turned off, the temperature within the set, and thereby the ambient temperature of the lens assembly 23 shown in FIG. 2, is reduced and, as cooling occurs, the first "C" element 18 returns to its original position. Similarly, the bars 41, when cooled, contract to their original position and the lens cell assembly 23 is returned to its original position. Thereby, when the set is next turned on, focus is proper.

There will now be described the construction of specific components for forming the lens assembly 23 shown in FIG. 2 and for realizing the most preferred embodiment of the invention.

Figure 3:
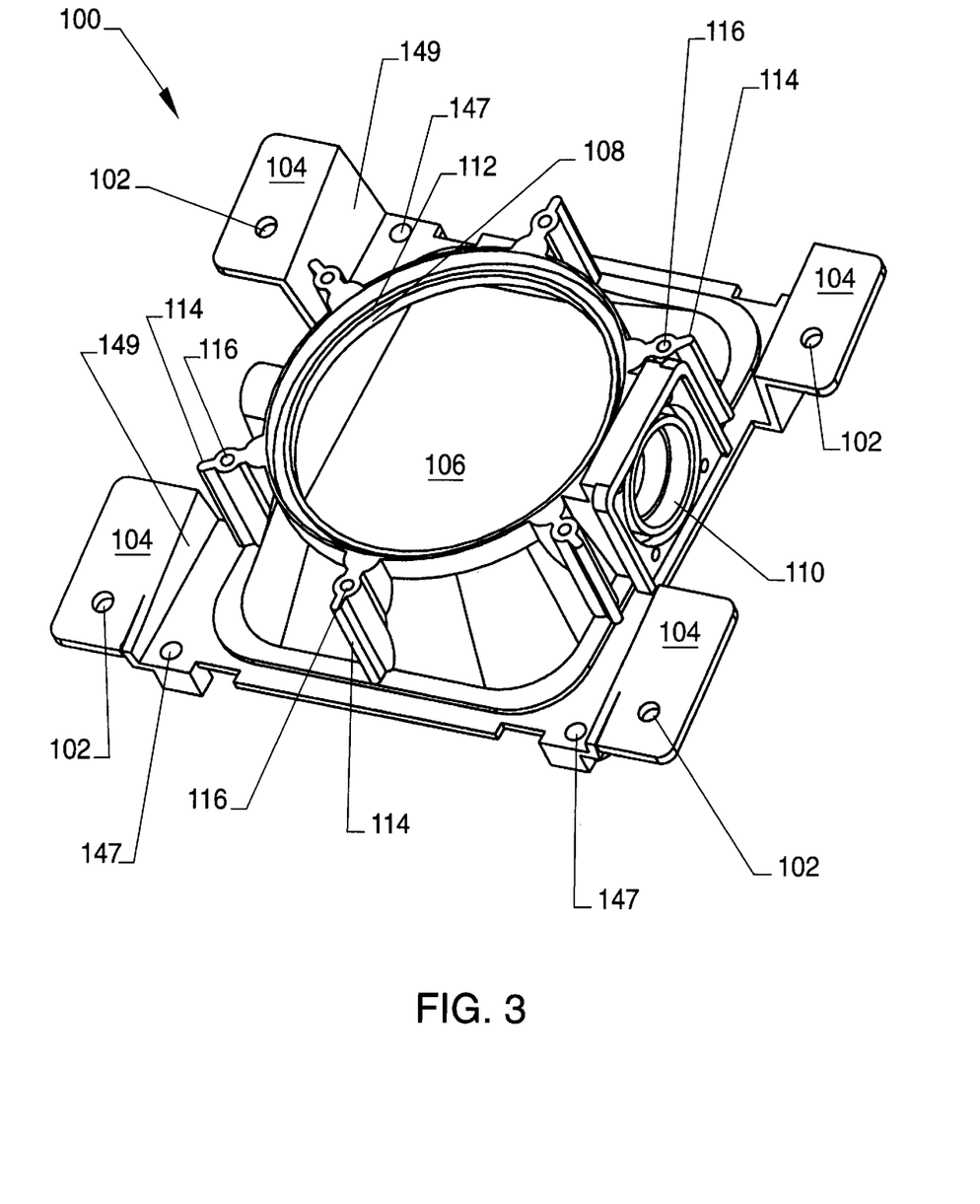
FIG. 3 is a perspective view of a coupler.

Shown in FIG. 3 is the image side of a coupler 100 which is designed to be affixed to a CRT 9 in a conventional manner known to those skilled in the art. The coupler 100 is typically made of a molded plastic material. Typically, a bracket is strapped around the CRT 9 and includes receiving brackets. When affixed to the CRT 9, a bolt extends through each bracket and passes through each of the holes 147 located in each corner of the coupler 100. The coupler 100 is thereby mounted on and sealed to the face of the CRT 9. As shown in FIG. 3, the image side of the coupler 100 terminates in a circular opening 106 which includes a ledge 108. The coupler 100 includes an aperture 110 which may be used to fill the coupler 100 with a coupling liquid when final lens assembly 23 is complete. An O-ring 112 is positioned on the ledge 108. Surrounding the circular opening 106 are upstanding stanchions 114, each having an alignment pin-receiving aperture 116 in the end thereof. The coupler 100 shown in FIG. 3 has six such stanchions 114. The pin-receiving apertures 116 are alignment apertures and their function will be described below. In each corner of the coupler 100 is an upstanding web 149 which terminates at a land 104 having an aperture 102 therein. The lands 104 are co-planar and when the coupler 100 is mounted on a CRT 9, the lands face the image side of the lens assembly 23.

Figure 4:
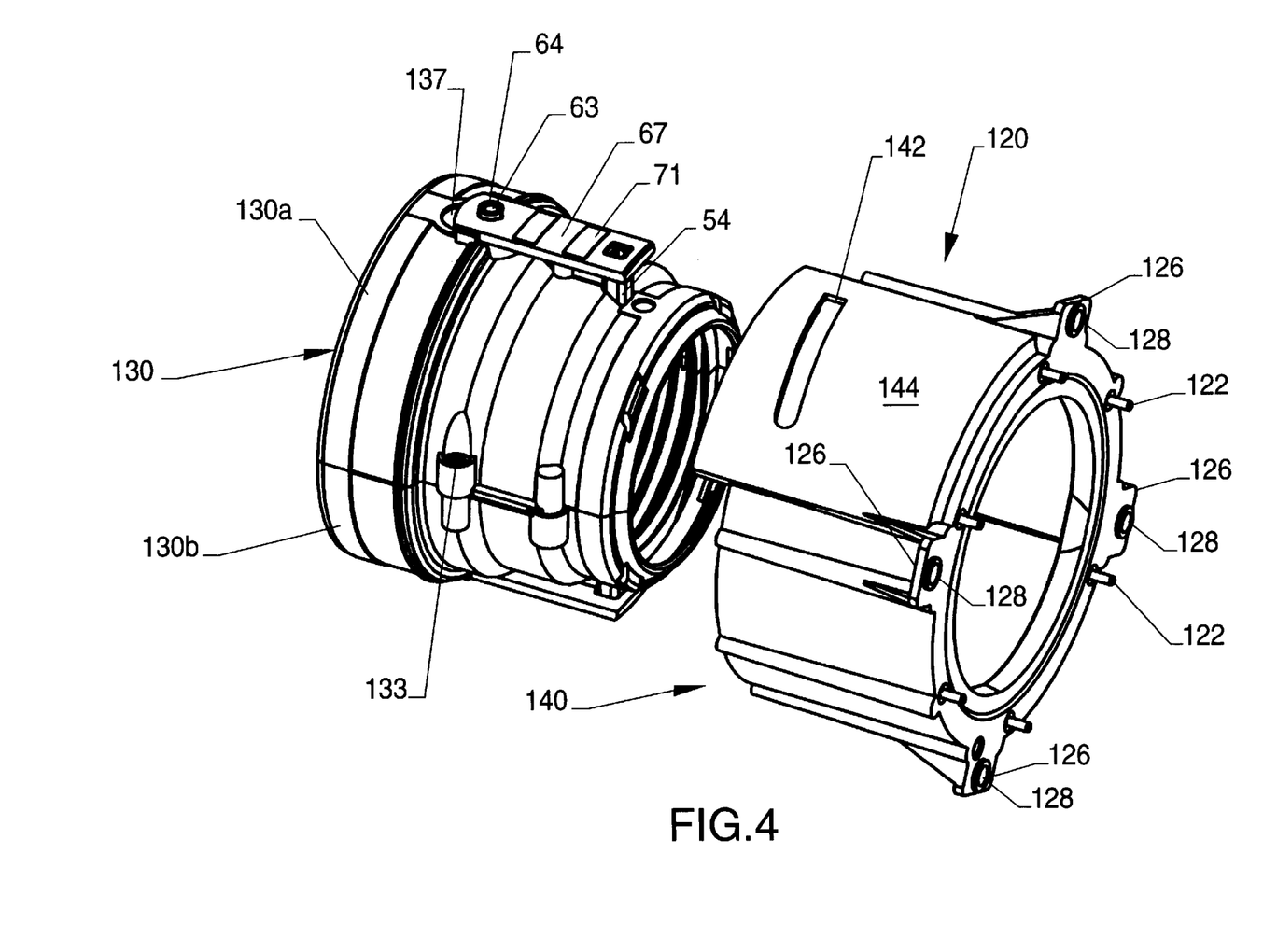
FIG. 4 is a perspective, exploded view of a focus mount and lens cell.

Referring to FIG. 4, shown therein is a focus mount 120 which, like the coupler 100, is typically made of a molded polymer. Extending from the lower or object side of the focus mount 120 are six alignment pins 122. Located around the periphery of the focus mount 120 at the object side thereof are four mounting brackets 126, each of which includes an aperture 128. Further, the upper side of the focus mount 120 has a web 144, which has a focusing slot 142.

In the assembly operation, the coupler 100 shown in FIG. 3 is affixed to a CRT 9 as described above. Thereafter, the "C" element or the first lens element 18 shown in FIG. 2, is positioned on top of the coupler 100 in the opening 106 and the convex portion of the lens extends downwardly therein, i.e. it is positioned in the circular opening 106 and its periphery rests on the O-ring 112 which is supported by the ledge 108. Thereafter, the focus mount 120 shown in FIG. 4 is mated with the coupler 100 by inserting the alignment pins 122 into each of the alignment pin-receiving apertures 116, thus bringing the focus mount into a sealing engagement with the coupler 100. Thereby, the peripheral surface 129 of the coupler 100 mates with the periphery of the "C" element which was previously positioned within the circular opening 106 of the coupler 100. As a consequence of this mating operation, each mounting bracket 126 on the focus mount 120 is brought into face-to-face engagement with a respective land 104 on the coupler 100 and each aperture 128 in each mounting bracket 126 is brought into alignment with a respective aperture 102 of one of the lands 104. A bolt is passed through each of the aperture 102 and aperture 128 and thereby the focus mount 120 is fixed to the face of the coupler 100.

FIG. 4 also shows a lens cell 130. As will be described in more detail hereinafter, the lens cell 130 is comprised of two lens cell halves, 130*a* and 130*b*, respectively, which when mated, form the lens cell 130. The lens cell halves 130*a* and 130*b* are locked together by securing a screw into each of four openings 133, located on the lens cell half, partially, shown in FIG. 5. In the assembly of a lens cell 130, the lenses contained therein, for example, the so-called "A" Group and "B" Group lens elements 26 and 28, respectively, are placed within the interior of a first lens cell half. The periphery of each lens is received in a groove molded in the interior of the first lens cell half. When the lenses are so positioned, a mating lens cell half is joined to the first lens cell half and the two lens cell halves are locked together by securing four screws into the four openings 133 of the lens cell 130.

The lens cell 130 shown in FIG. 4 includes the components which together comprise the preferred embodiment of the invention. Thus, referring to the lens cell half 130A shown in FIG. 5, there is provided an upstanding support rib 132, which is an integral part of the lens cell half 130*a* and is positioned approximately in the middle portion of the lens cell half 130*a*. The support rib 132 comprises a column member 54 at one end and a recessed oval slot 137 at an opposite end. An expansion or thermal bar assembly 66 (shown in FIG. 6*c*) is positioned on top of the support rib 132. The thermal bar assembly 66 comprises of a thermal bar 67 and a boss member 64. In particular the thermal bar 67 has a column-receiving hole 69 that corresponds to the shape of the column member 54 and securely receives the column member 54 shown in FIGS. 6*a*–6*c*. Further, the thermal bar 67 has a larger aperture 68 that is sized to securely receive the boss member 64 (shown in FIG. 6*c*). The thermal bar 67 also has two (2) pads 71 that are located in between the column-receiving hole 69 and the aperture 68. As shown in FIG. 6*c* the boss member 64 has a cylindrical body 62*c*, which has an interior core 63 that is threaded. Also, one end of the cylindrical body 62*c* has a radial flange 62, that is integral with the cylindrical body 62*c*. The radial flange 62 has two ribs 61 on an upper side 62*a* of the flange 62, where each rib 61 is approximately 180° apart from each other. The boss member 64 is secured within the aperture 68 through the bottom of the thermal bar 67, so that the ribs 61 on the upper side 62*a* of the flange 62 mate with a corresponding set of slots 65 on the bottom of the thermal bar 67 (shown in FIG. 6*b*), thus, securing the boss member 64 within the aperture 68 of the thermal bar 67, shown in FIGS. 6*d* and 6*e*. One end of the thermal bar assembly 66 is anchored to the column member 54 of the lens cell half 130*a* via the column-receiving hole 69, whereas, the end with the boss member 64 is disposed within the interior of the recessed oval slot 137 of the lens cell half 130*a*. The bottom side of the flange 62 comes into frictional engagement with the lens cell half 130*a* where the flange 62 of the boss member 64 is secured within the recessed oval slot 137. Thereby, when the lens cell half 130*a* is joined to its mating cell half 130*b*, one end of the thermal bar 67 extends longitudinally towards the image side of the lens cell 130 and is fixed to the lens cell 130 via the column member 54. Similarly, the mating lens cell half 130*b* has a thermal bar assembly 66 secured to it and the two lens cell halves are locked together with screws that are threaded into the apertures 133, shown in FIGS. 5 and 7.

Figure 8:
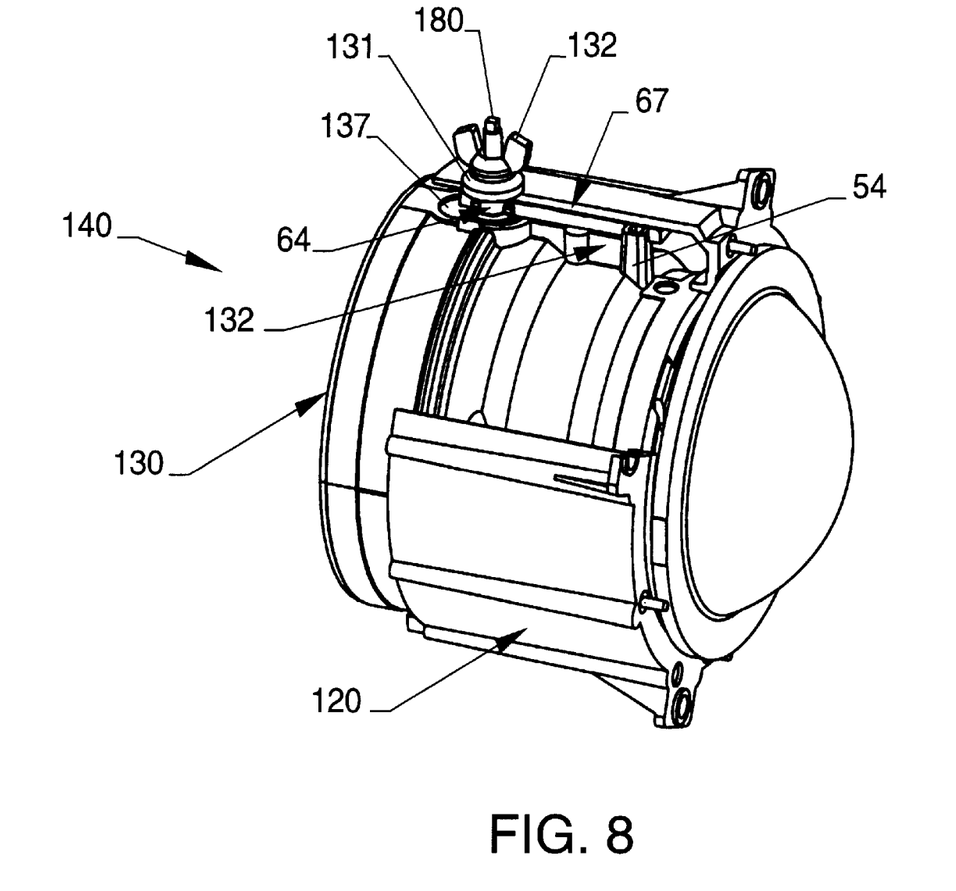
FIG. 8 is a fragmentary perspective view of a lens cell assembly of the present invention.

The assembly of the units shown in FIG. 4 proceeds as follows. After the focus mount 120 is mounted on the coupler 100 as described above, the lens cell 130 is inserted into the focus mount 120 as indicated by the arrow 140 in FIG. 4. The lens cell 130 is positioned within the focus mount 120 so that the boss member 64 is positioned below and secured within the focusing slot 142 in the web 144. The cylindrical body 62*c* of the boss member 64 extends outwardly through the focusing slot 142 in the web 144. A fastening screw 180 is inserted and threaded into the interior core 63 of the boss member 64 through the outside of the focus mount 120, as shown in FIG. 8. Thereupon, when the CRT 9 is activated, the lens cell 130 may be rotated and because each of the focusing slots 142 is obliquely disposed, this rotation of the lens cell 130 causes longitudinal movement and thereby the set may be focused. When focus is achieved, the fastening screw 180 is tightened whereby the upper side 62*a* of the flange 62 of the boss member 64 is brought into bearing contact and tight frictional engagement with the undersurface of the web 144 surrounding the focusing slot 142. Moreover, the two pads 71 come into frictional contact with the inner surface of the focus mount 120. When arrangement is achieved, it will be appreciated that the lens cell 130 is retained within the focus mount 120 by virtue of the thermal bar assembly 66, which is anchored at one end to the lens cell 130 via the column member 54 and at the other end to the focus mount 120 via the boss member 64. As the thermal bar 67 expands due to the ambient temperature change in the set, the heat energy is directed towards the end of the thermal bar 67 which is anchored to the lens cell 130 via the column member 54. Thus, the lens cell 130 is only permitted to move axially in the direction of the "C" lens element.

The details of the structure and the assembly of the apparatus described above are illustrated in FIGS. 5–8.

Figure 5:
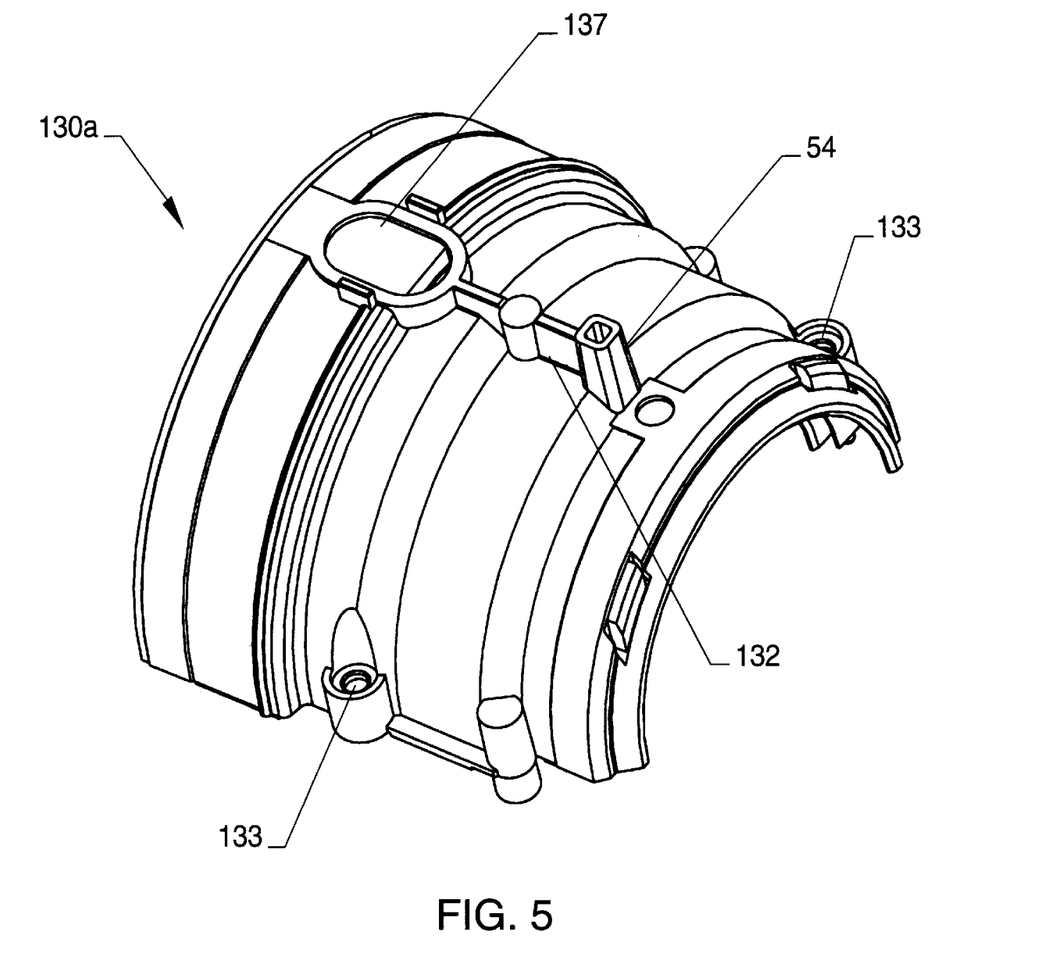
FIG. 5 is a perspective view of a lens cell half which, together with its mating half, forms the lens cell.
Figure 6A:
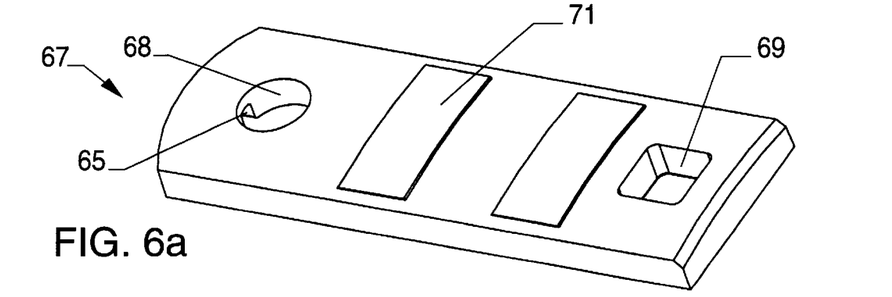
FIG. 6a is a perspective view of a thermal bar embodying the preferred embodiment of the invention.
Figure 6B:
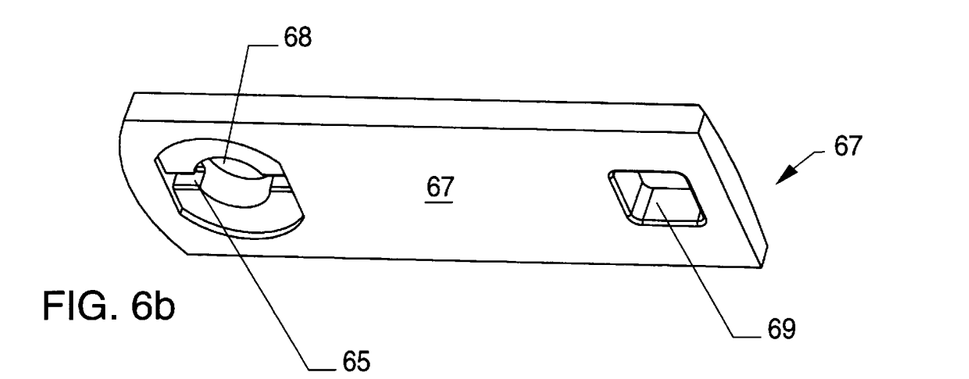
Figure 6C:
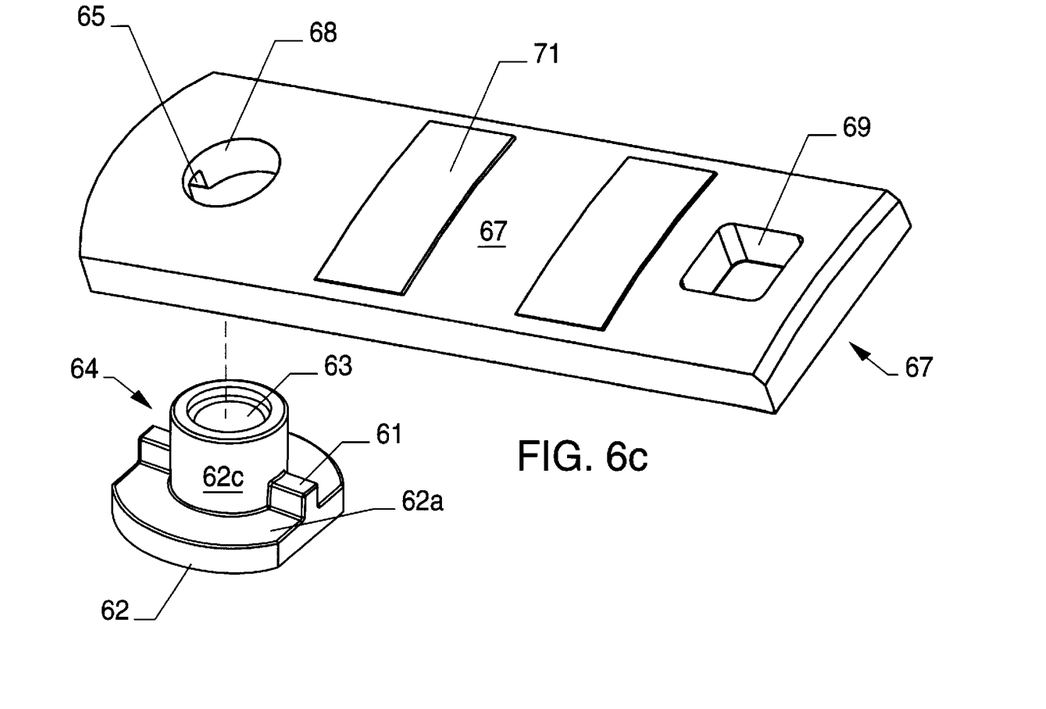
FIG. 6c is an exploded view of a thermal bar assembly embodying the preferred embodiment of the invention.
Figure 6D:
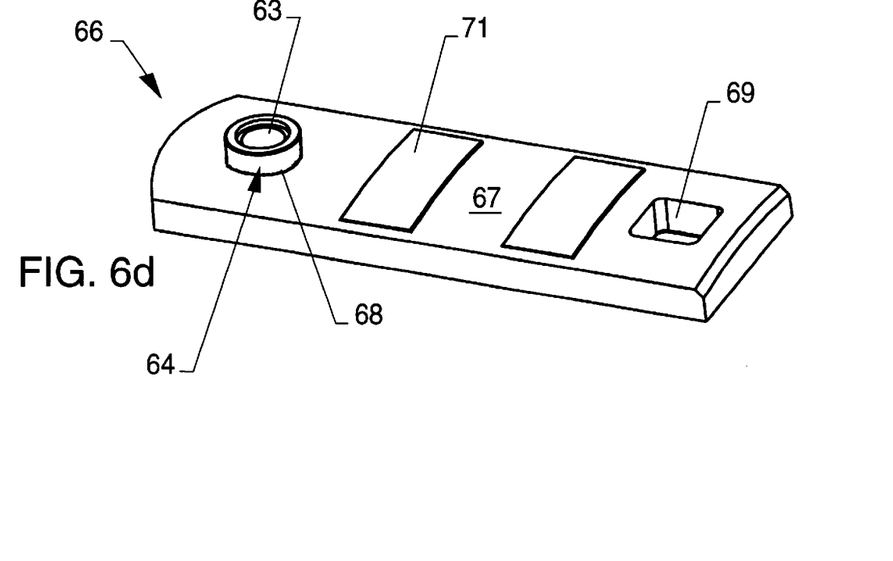
FIG. 6d is a perspective view of the thermal bar assembly shown in FIG. 6c.
Figure 6E:
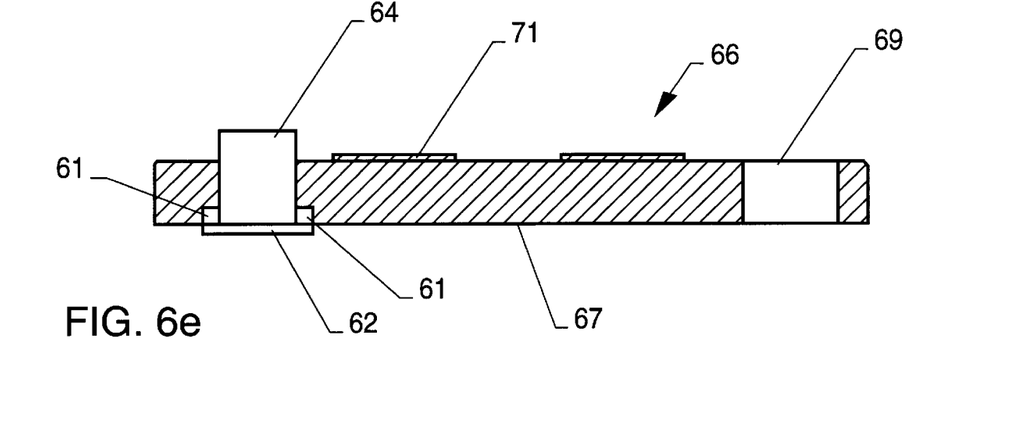
FIG. 6e is a side-sectional view of the thermal bar assembly shown in FIG. 6d.

Referring to FIG. 5, only half of the lens cell 130 is shown; the other half is omitted for clarity. Two of the openings 133, which engage mating parts on the other half of the lens cell, are clearly shown in FIG. 5. Also shown is the support rib 132 and the column member 54 which is molded as an integral part of the lens cell half 130a. At the screen side of the lens cell half 130a, a recessed oval slot 137 is provided. The boss member 64 is shown positioned in the interior of the lens cell 130 and extending radially outward through the recessed slot 137. A more detailed view of the boss member 64 is shown perspectively in FIG. 6c.

Referring again to FIG. 5, the shape of the slotted hole 137 is significant. Specifically, as described above, when the lens assembly 140 is complete and the device is being used, in response to increases in the ambient temperature the lens cell 130 will axially move toward the CRT 9. In order to allow such movement, it is necessary to provide the oval or elongated recessed slot 137. In other words, the cylindrical body 62c of the boss member 64 will be fixed to the focus mount 120 and cannot move, whereas, the flange 62 of the boss member 64 is the part that is held within the recessed oval slot 137, but is permitted to move axially within the recessed oval slot 137. To insure that the lens cell 130 can axially move, it is necessary to provide the elongated recessed slot 137.

Figure 7:
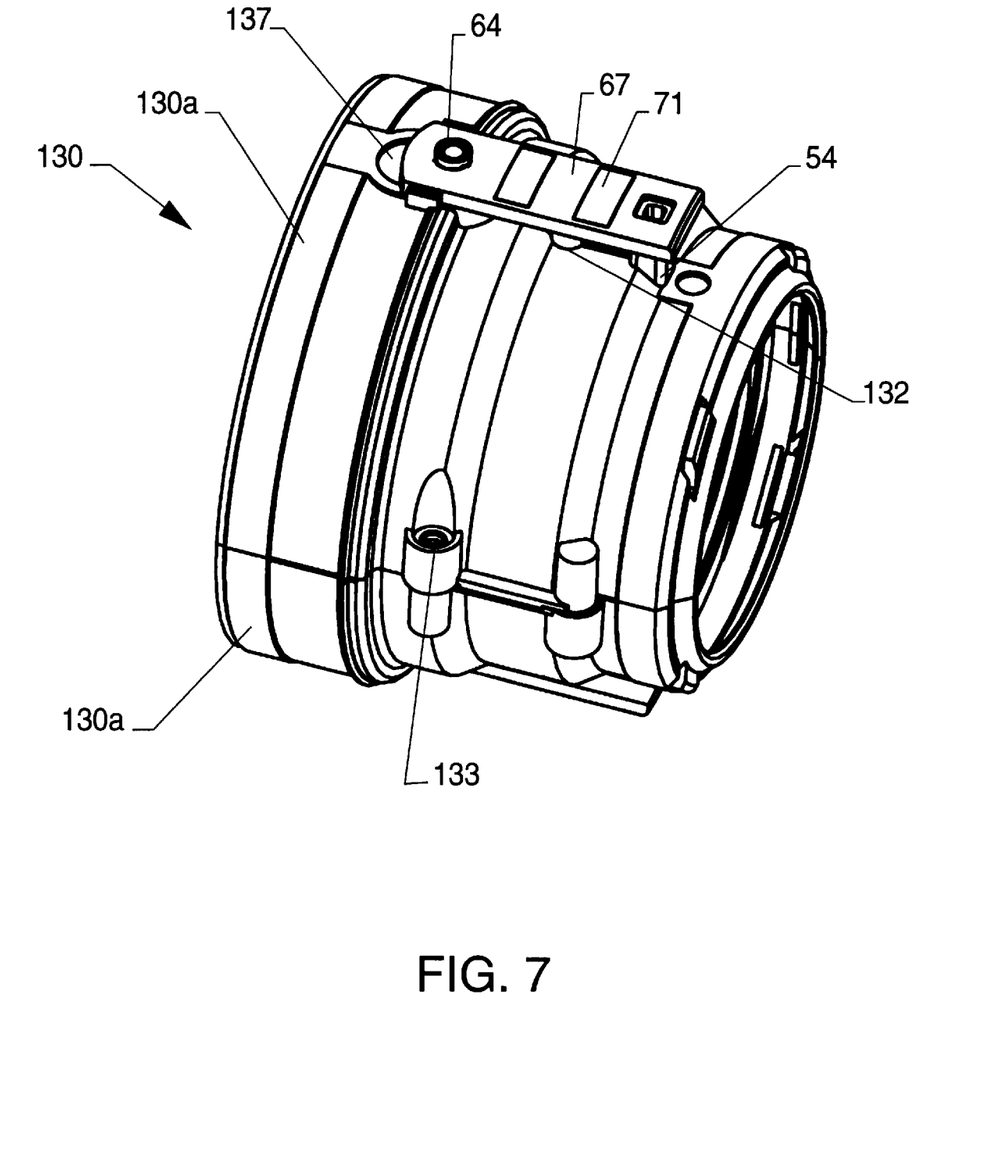
FIG. 7 is a perspective view of a lens cell used in the preferred embodiment of the invention.

Referring to FIG. 7, the lens cell 130 is shown with a thermal bar assembly 66 attached thereon. As shown in FIG. 7, and as described above, the column member 54 extends through the column-receiving aperture 69 provided at one end of the thermal bar 67. The size of the column member 54 and the aperture 69 are such that there is a tight frictional engagement of the column member 54 and the aperture 69. At the other end of the upper portion of the cylindrical body 62c extends through the larger aperture 68 of the thermal bar 67. As a result, when the lens cell 130 is positioned within the focus mount 120 as shown in FIG. 8, the lens cell 130 is attached to the focus mount 120 through the expansion bar 67 and the boss member 64, which is affixed to the focus mount 120 by securing a fastening screw 180 within the core 63 of the boss member 64 and tightening the lens assembly 140 with a washer 181 and a nut 182. Consequently, in operation, the lens cell 130 may move axially, in response to change in ambient temperature, as functionally indicated in FIG. 2.

In one preferred embodiment of the invention, the thermal bar 67 is made from high-density polyethylene. In general, and as indicated previously, the material for the thermal bar 67 is selected so that, in view of the anticipated temperature change and the anticipated distortion of the "C" element 18, the focus mount 120 will undergo movement sufficient to compensate for the distortion of the first "C" element 18 and the change in power of the lens formed by that element. Calculations required to determine the distortion of the "C" element 18 and the resulting change in power are evident to those skilled in the art to which this invention pertains. Once the change in power has been determined, then, depending on the nature of the lenses contained in the lens cell 130, those skilled in the art can determine the extent to which the lens cell 130 must move toward the CRT 9. Having determined that distance, it is then a trivial matter to determine, knowing the anticipated temperature change, the required thermal coefficient of expansion and length for the thermal bar 67.

Accordingly, after assembling together the projection television lens assembly 140 of the present invention, the lens assembly 140 is initially manually focused to a manually adjusted focus position by simultaneously rotating the lens cell 130 with respect to the focus mount 120 and by axially moving the lens cell 130 with respect to the focus mount 120. The manually adjusted focus position is subsequently locked in place by a fastening screw 180 that locks the position of the lens cell 130 with respect to the focus mount 120, which prevents any further rotational movement of the lens cell 130 within the focus mount 120. Consequently, upon locking the manually adjusted focus position, the lens assembly 140 is then automatically focused in response to changes in the ambient temperature of the lens assembly 140. In particular, changes in the ambient temperature of the lens assembly 140 causes expansion of the thermal bar 67, which causes only the axial movement and not the rotational movement of the lens cell 130 with respect to the focus mount 120.

Although a specific embodiment of the invention has been described in detail herein, variations thereof will be evident to those skilled in the art without departing from the invention as described in the appended claims.

What is claimed:

1. A projection television lens assembly comprising:
   a) a first housing adapted for mounting on an image forming device and including at least a first lens;
   b) at least one other lens positioned in a second housing and on a screen side of said first lens; and
   c) at least one bar member that is fixedly connected to said first housing at one end and is fixedly connected to said second housing at the other end, said bar member being positioned between said first housing and said second housing, wherein said bar member causes only axial and not rotational movement of said at least one other lens toward and away from said first lens in response to changes in the ambient temperature to which said lens assembly is exposed.

2. The assembly of claim 1, wherein the image forming device is a CRT.

3. The assembly of claim 1, wherein there are at least two other lenses on the screen side of said first lens and the distance between said at least two other lenses is fixed.

4. The assembly of claim 3, wherein the lens which comprises one of said at least two other lenses and which is closest to said first lens contributes more than half of the positive power of said lens assembly.

5. The assembly of claim 4, wherein said first lens and the lens closest to the screen side are plastic lenses and said lens which contributes most of the positive power of the lens assembly is a glass lens.

6. The assembly of claim 1, wherein said bar member further comprises two apertures spaced apart from each other, one of said apertures securing a column member extending from said second housing and the other of said apertures securing a boss member, one end of said boss member being slidably secured in an oval-shaped recessed slot of said second housing, and the other end of said boss member being fixedly connected to said first housing.

7. The assembly of claim 6, wherein said boss member has an internally threaded aperture at said other end proximate to said first housing for receiving a fastening screw.

8. A projection television lens assembly comprising:
   a) a CRT;
   b) a coupler assembly fixed to said CRT;
   c) a plastic lens which is concave to said CRT and which is fixed to said coupler;
   d) a first tube which is fixedly mounted with respect to said coupler;
   e) a second tube positioned within said first tube;

f) at least one lens mounted within said second tube; and g) at least one longitudinally extending bar which is connected at one end to said second tube and which is connected at another end to said first tube, said bar being disposed between said first tube and said second tube, wherein the coefficient of thermal expansion and length of said bar are selected such that when the ambient temperature of said lens assembly is varied said bar expands and contracts in only an axial direction, causing only axial movement and not rotational movement of said second tube with respect to said first tube to correct for the change in the optical properties of said lens assembly as a result of distortion of said plastic lens.

9. The lens assembly of claim 8, wherein said at least one bar is connected to said first tube at a position closer to the screen side of said lens assembly than the position at which said bar is connected to said second tube.

10. The lens assembly of claim 9, wherein said second tube contains two lenses which are fixedly positioned within said second tube.

11. The lens assembly of claim 10, wherein said bar further comprises two apertures spaced apart from each other, one of said apertures securing a column member extending from said second tube and the other of said apertures securing a boss member, one end of said boss member being slidably secured in an oval-shaped recessed slot of said second tube, and the other end of said boss member being fixedly connected to said first tube.

12. An assembly forming part of a projection television lens system which includes a first tube, said assembly comprising:

a) a lens tube adapted and sized to be received within said first tube;

b) at least two lenses fixedly mounted in said lens tube; and, c) at least one bar member fixedly connected to said lens tube at one end of said bar member and fixedly connected to said first tube at the other end of said bar member, said bar member further comprising two apertures spaced apart from each other, one of said apertures securing a column member extending from said lens tube and the other of said apertures securing a boss member, one end of said boss member being slidably secured in an oval-shaped recessed slot of said lens tube, and the other end of said boss member being fixedly connected to said first tube, wherein said bar member automatically adjusts the focus of said projection television lens system by axial and not rotational movement of said lens tube in response to changes in the ambient temperature to which said projection television lens assembly is subjected during operation.

13. The assembly of claim 12, wherein said boss member has an internally threaded aperture at said other end proximate to said first tube for receiving a fastening screw.

14. The assembly of claim 13, further comprising a second bar member which is adapted to be fixedly connected to said lens tube in the same manner as said at least one bar member but located approximately 180° on the opposite side of said lens tube.

15. A method of adjusting the focus of a projection television lens assembly which includes a CRT, a coupler fastened to said CRT, a focus mount fastened to said coupler, a lens cell assembly positioned within said focus mount and containing at least two lenses, a plastic lens positioned close to and convex to said CRT, said method comprising the steps of: initially manually adjusting both in an axial and in a rotational direction said projection television lens assembly to a manually-adjusted focus position; and subsequently automatically adjusting said manually-adjusted focus position only in said axial direction and not in said rotational direction in response to changes in the ambient temperature to which said projection lens assembly is subjected during operation.

16. The method of claim 15, wherein the step of subsequently automatically adjusting comprises the step of first locking in said manually-adjusted focus position.

* * * * *